United States Patent
Belcea et al.

(10) Patent No.: US 8,576,811 B2
(45) Date of Patent: Nov. 5, 2013

(54) SYSTEM, METHOD AND APPARATUS FOR RELIABLE EXCHANGE OF INFORMATION BETWEEN NODES OF A MULTI-HOP WIRELESS COMMUNICATION NETWORK

(75) Inventors: John Belcea, West Melbourne, FL (US); Pertti O. Alapuranen, Deltona, FL (US); Michael S. Johnson, Orlando, FL (US); Avinash Joshi, Orlando, FL (US); Robin U. Roberts, Orlando, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1724 days.

(21) Appl. No.: 11/348,607

(22) Filed: Feb. 6, 2006

(65) Prior Publication Data
US 2007/0211686 A1 Sep. 13, 2007

(51) Int. Cl.
*H04W 4/00* (2009.01)

(52) U.S. Cl.
USPC ........... 370/338; 370/330; 370/345; 370/329; 455/519; 455/518; 455/509; 455/450

(58) Field of Classification Search
USPC .......... 370/338, 330, 345, 329; 455/518, 519, 455/509, 450
See application file for complete search history.

(56) References Cited

U.S. PATENT DOCUMENTS

| | | | |
|---|---|---|---|
| 5,583,864 A | 12/1996 | Lightfoot et al. | |
| 6,404,756 B1 | 6/2002 | Whitehill et al. | |
| 6,487,186 B1 | 11/2002 | Young et al. | |
| 6,553,020 B1 | 4/2003 | Hughes et al. | |
| 6,711,177 B1 | 3/2004 | Young | |
| 6,885,651 B1 | 4/2005 | Young | |
| 7,349,362 B2 | 3/2008 | Belcea | |
| 7,366,151 B2 * | 4/2008 | Kubler et al. | 370/338 |
| 2002/0044537 A1 | 4/2002 | Ades et al. | |
| 2002/0114313 A1* | 8/2002 | Walsh et al. | 370/348 |
| 2004/0143842 A1 | 7/2004 | Joshi | |
| 2005/0058151 A1 | 3/2005 | Yeh | |
| 2005/0169217 A1* | 8/2005 | Pan | 370/335 |
| 2006/0002341 A1 | 1/2006 | Bejerano et al. | |
| 2007/0104215 A1* | 5/2007 | Wang et al. | 370/458 |
| 2010/0129080 A1* | 5/2010 | Saniee et al. | 398/79 |

FOREIGN PATENT DOCUMENTS

| | | |
|---|---|---|
| WO | 02/28020 A2 | 4/2002 |
| WO | 02082743 A2 | 10/2002 |
| WO | 2005/034473 A2 | 4/2005 |

OTHER PUBLICATIONS

PCT/US07/61305, International Search Report and Written Opinion, mailed Dec. 21, 2007, 8 pages.
German Patent Office, German Application No. 11 2007 000 250.6-55, Office Action [translated], Feb. 17, 2009, 3 pages.

* cited by examiner

*Primary Examiner* — Justin Lee

(57) ABSTRACT

Techniques are provided for reliably distributing network management information in and ad hoc multi-hop wireless network which includes a number of existing nodes. A first node selects a particular timeslot in a dedicated channel based on the network management information received from the neighbor nodes and determines, via a contention channel, if the particular timeslot is being used by any neighbor nodes of the first node. If the particular timeslot is determined to be unused, then it is assigned to the first node for periodically transmitting network management information.

19 Claims, 6 Drawing Sheets

SYSTEM, METHOD AND APPARATUS FOR RELIABLE EXCHANGE OF INFORMATION BETWEEN NODES OF A MULTI-HOP WIRELESS COMMUNICATION NETWORK

FIELD OF THE INVENTION

The present invention relates generally to wireless communications and more particularly to mobile ad hoc multi-hopping networks.

BACKGROUND

Types of wireless networks include infrastructure-based wireless networks and ad hoc wireless networks.

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station. Infrastructure-based Time Division Multiple Access (TDMA) networks typically employ central scheduling via a central, fixed controller (such as a base station). In these networks, TDMA protocols can be used to assign a timeslot to each flow or user in the network. For example, circuit switched TDMA-based voice systems usually allocate a single timeslot in a frame for a single voice connection for a period of time. By contrast, systems which tend to carry bursty data typically use dynamic allocation schemes to assign timeslots. For instance, Demand Assigned Multiple Access (DAMA) systems can be used to allocate timeslots on demand.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node should maintain routing information collected through conversation with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), described in U.S. Patent Publication 20040143842 which is incorporated by reference herein in its entirety, nodes periodically send HELLO messages (e.g., once per second) that contain routing information and metrics associated with a route to a central node. Mobile nodes use information extracted from the HELLO messages to decide the most efficient manner for performing handoff. However, in many cases the HELLO messages are not transmitted in a reliable manner which can affect the efficiency of transmitting routing information, which in turn affects communication reliability.

Wireless local area networks typically use protocols such as IEEE 802.11x or IEEE 802.16 to assign timeslots to nodes in a network.

IEEE 802.11x protocols use a fixed Access Point (AP) that manages the network operations in a manner that is similar to the way base stations manage the operations in cellular wireless networks. Given the dynamic nature of nodes in a ad hoc multi-hopping network, these protocols can not provide efficient resource management. IEEE 802.16 protocols use base stations to assign timeslots to each node. Each node rebroadcasts a "slot allocation matrix" of the network. Centralized allocation of timeslots requires exchanging a large amount of network management information, which consumes valuable communication bandwidth. Centralized timeslot allocation techniques are typically applied in networks where the length of the communication path is relatively small (e.g., only one hop). Applying centralized timeslot allocation techniques in multi-hopping networks can be problematic because the of the significant amount of time required for propagating information from nodes at the periphery of the network to a central node, and for propagating information from the central node back to the nodes at the periphery of the network. Centralized timeslot allocation techniques are inefficient for reaching all network nodes due to mobility of nodes and the relatively long time needed for propagating the information to each node in the network. For this reason, in mobile multi-hopping networks, where the topology of nodes changes frequently, the utilization of centralized timeslot allocation techniques is prohibitive.

Current TDMA-based wireless networks are generally designed for transporting voice data using a particular modulation and relative low data rate. However, the techniques used in these networks cannot easily be applied to systems transporting time sensitive data such as interactive voice/video and non-interactive data such as one way audio/video at variable modulation and high data rates.

The protocols for timeslot allocation discussed above can be used in infrastructure based networks, but do not perform well or can even fail in ad hoc, multi-hopping networks where the node positions and data rate for each link change dynamically.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
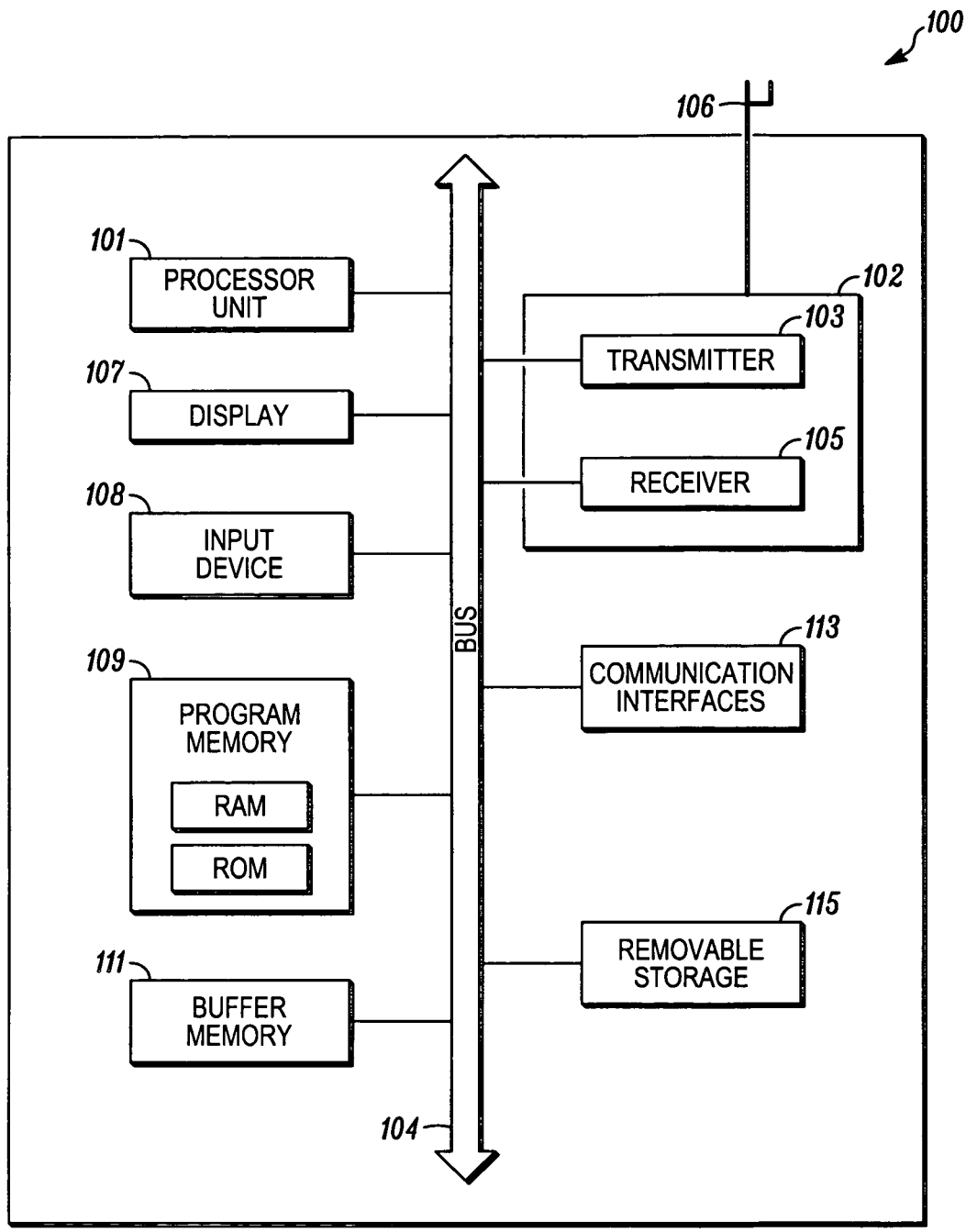
FIG. 1 is a block diagram of an exemplary node in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to allocating timeslots to nodes in an ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for allocating timeslots to nodes in an ad hoc network as described herein. The non-processor circuits may include, but are not limited to, a radio receiver, a radio transmitter, signal drivers, clock circuits, power source circuits, and user input devices. As such, these functions may be interpreted as steps of a method for allocating timeslots to nodes in an ad hoc network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

It would be desirable to provide techniques that could be distributed among nodes in ad hoc multi-hopping networks for allocating timeslots. It would also be desirable that such techniques would allow the reuse of timeslots. It would also be desirable that such techniques do not require excessive computational overhead.

Techniques are provided herein for reliably distributing network management information in an ad hoc multi-hop wireless network which includes any number of existing nodes. When a new node enters the ad hoc network, it selects a particular timeslot in a dedicated channel and determines, via a contention channel, if the particular timeslot is being used by any of the neighboring nodes within two hops. The network management information broadcast by the neighbor nodes associated with the new node on the dedicated channel are used for making assignment decisions. If a particular timeslot is identified as available (e.g., unused by any direct neighbor node or by neighbors of any of the direct neighbor nodes), then the new node selects it for reliably broadcasting information.

Exemplary Node

FIG. 1 is a block diagram of an exemplary node 100 in accordance with some embodiments of the invention. The node 100 comprises a processor 101, a transceiver 102 including a transmitter circuitry 103 and a receiver circuitry 105, an antenna 106, a display 107, an input device 108, a program memory 109 for storing operating instructions that are executed by the processor 101, a buffer memory 111, one or more communication interfaces 113, and a removable storage unit 115. Although not shown, the node 100 also preferably includes an antenna switch, duplexer, circulator, or other highly isolative means (not shown) for intermittently providing information packets from the transmitter circuitry 103 to the antenna 106 and from the antenna 106 to the receiver circuitry 105. The node 100 is preferably an integrated unit containing at least all the elements depicted in FIG. 1, as well as any other elements necessary for the node 100 to perform its particular functions. Alternatively, the node 100 may comprise a collection of appropriately interconnected units or devices, wherein such units or devices perform functions that are equivalent to the functions performed by the elements of the node 100. For example, the node 100 may comprise a laptop computer and a wireless LAN (local area network) card.

The processor 101 preferably includes one or more microprocessors, microcontrollers, DSPs (digital signal processors), state machines, logic circuitry, or any other device or devices that process information based on operational or programming instructions. Such operational or programming instructions are preferably stored in the program memory 109. The program memory 109 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 101 has one or more of its functions performed by a state machine or logic circuitry, the memory 109 containing the corresponding operational instructions may be embedded within the state machine or logic circuitry. The operations performed by the processor 101 and the rest of the node 100 are described in detail below.

The transmitter circuitry 103 and the receiver circuitry 105 enable the node 100 to communicate information packets to and acquire information packets from the other nodes. In this regard, the transmitter circuitry 103 and the receiver circuitry 105 include conventional circuitry to enable digital or analog transmissions over a wireless communication channel. The transmitter circuitry 103 and the receiver circuitry 105 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax, and the like)

The implementations of the transmitter circuitry 103 and the receiver circuitry 105 depend on the implementation of the node 100. For example, the transmitter circuitry 103 and the receiver circuitry 105 can be implemented as an appropriate wireless modem, or as conventional transmitting and receiving components of two-way wireless communication devices. In the event that the transmitter circuitry 103 and the receiver circuitry 105 are implemented as a wireless modem, the modem can be internal to the node 100 or insertable into the node 100 (e.g., embodied in a wireless radio frequency (RF) modem implemented on a Personal Computer Memory Card International Association (PCMCIA) card). For a wireless communication device, the transmitter circuitry 103 and the receiver circuitry 105 are preferably implemented as part of the wireless device hardware and software architecture in accordance with known techniques. Most, if not all, of the functions of the transmitter circuitry 103 and/or the receiver circuitry 105 may be implemented in a processor, such as the processor 101. However, the processor 101, the transmitter circuitry 103, and the receiver circuitry 105 have been artificially partitioned herein to facilitate a better understanding.

The receiver circuitry 105 is capable of receiving RF signals from at least one bandwidth and optionally more bandwidths, if the communications with the proximate device are in a frequency band other than that of the network communications. The receiver circuitry 105 may optionally comprise a first receiver and a second receiver, or one receiver capable of receiving in two or more bandwidths. The transceiver 102 includes at least one set of transmitter circuitry 103. The at least one transmitter 103 may be capable of transmitting to multiple devices on multiple frequency bands. As with the receiver 105, dual transmitters 103 may optionally be employed where one transmitter is for the transmission to a proximate node or direct link establishment to WLAN's and the other transmitter is for transmission to a cellular base station.

The antenna 106 comprises any known or developed structure for radiating and receiving electromagnetic energy in the frequency range containing the wireless carrier frequencies.

The buffer memory 111 may be any form of volatile memory, such as RAM, and is used for temporarily storing received information packets in accordance with the present invention.

When the node 100 is constructed to receive video information from a video source, the node 100 preferably further includes a video decoder capable of decoding the current Moving Picture Experts Group (MPEG) standard or some other video decoding standard. When the node 100 is further capable of transmitting video information, the node 100 preferably further includes a video encoder capable of encoding the video data into at least one of the foregoing video standards. Such video encoder and decoder is preferably implemented as part of the processor 101.

As the node 100 enters the ad hoc network it begins receiving a dedicated channel being transmitted from other nodes which are in the vicinity of the new node.

Via antenna 106, the receiver 105 can receive a dedicated channel comprising information regarding which ones of a plurality of timeslots are in use by other nodes. The processor 101 can select a particular one of the timeslots in the dedicated channel which it perceives as being unused (based on the information the node 100 receives from its neighbor nodes). The transmitter 103 can then transmit an allocation announcement message via a contention channel. The allocation announcement message informs neighbor nodes that the node 100 is requesting that the particular timeslot be assigned to the node 100. The receiver 105 can then receive responses from neighbor nodes via the contention channel, and the processor 101 can determine, based on the responses, whether the particular timeslot is being used by any of existing nodes in the neighborhood which can interfere at some node in the ad hoc network. If a denial message is not received by the new node within a predetermined time period after transmitting the allocation announcement message, the transmitter 103 can transmit a HELLO message in the particular timeslot. This HELLO message lets other nodes in the ad hoc communication network know that the particular timeslot is currently being used by the node 100.

Exemplary Ad Hoc Multi-Hopping Network

Figure 2:
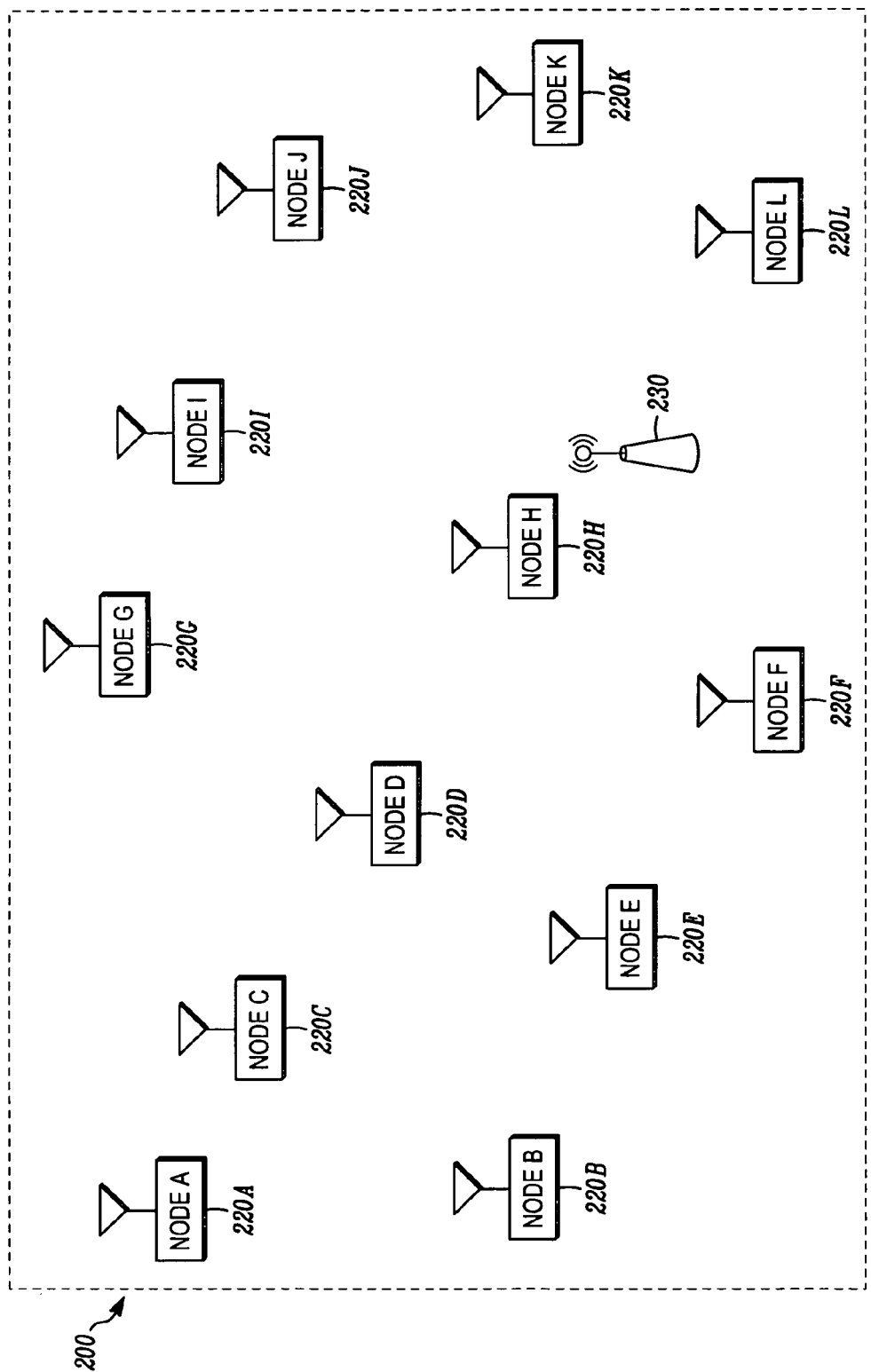
FIG. 2 is a block diagram of an exemplary peer-to-peer ad hoc multi-hopping communication network.

FIG. 2 is a block diagram of an exemplary ad hoc communication network 200 at a first time when the ad hoc communication network 200 comprises a number of existing nodes 220A-L.

The nodes 220A-220L typically support simultaneous operation in both infrastructureless mode and infrastructured mode and can move seamlessly between infrastructure-based networks (those including for example an Access Point AP 230) and client-based peer-to-peer networks which are free of any infrastructure.

The ad hoc multi-hopping communication network 200 can be created between a plurality of nodes 220A-220L each having wireless repeater and routing capability, and optionally a wired Access Point (AP) 230. Clients can move seamlessly between infrastructure-based networks and client-based peer-to-peer networks. It will be appreciated by those of ordinary skill in the art that while the ad hoc network 200 in FIG. 2 is shown as operating in an infrastructured mode (e.g., including APs and/or cellular base stations), the ad hoc network 200 of FIG. 2 does not require any network infrastructure to be present. Rather, the nodes 220A-220L typically support simultaneous operation in both infrastructureless mode and infrastructured mode.

In the ad hoc multi-hopping network 200, communications to and/or from nodes 220A-220L can "hop" through each other to reach other nodes 220A-220L in the network. The nodes 220A-220L can generally be wireless devices capable of receiving packetized audio, video and/or data information. Some of the components in an exemplary node, such as an exemplary processor, transmitter, receiver and antenna, are described above in FIG. 1. The nodes 220A-220L can exchange information as data packets transmitted over carrier frequencies, each of which includes one or more wireless communication channels.

In infrastructure mode, the access point AP 230 is typically coupled to a wired network (not shown) and can provide one or more sources of audio, video and/or data information. The access point AP 230 may be, for example, a cellular base station or other wireless access point.

Although not shown in FIG. 2, it will be appreciated by those of ordinary skill in the art that the nodes 220A-220L, can also communicate information packets with a cellular-based network (not shown) over wireless communication medium, each of which includes one or more wireless communication channels depending on the multiple access scheme utilized in the cellular-based network.

Each node 220A-220L can advertise its presence by periodically broadcasting the HELLO message. In turn, each node can identify its neighborhood by maintaining a list of nodes located in proximity to that node. As used herein, a "neighbor node" is a node which is one hop away from the node such that the nodes may communicate with each other. A particular node's neighbor list changes dynamically as the topology of the network changes.

Figure 3:
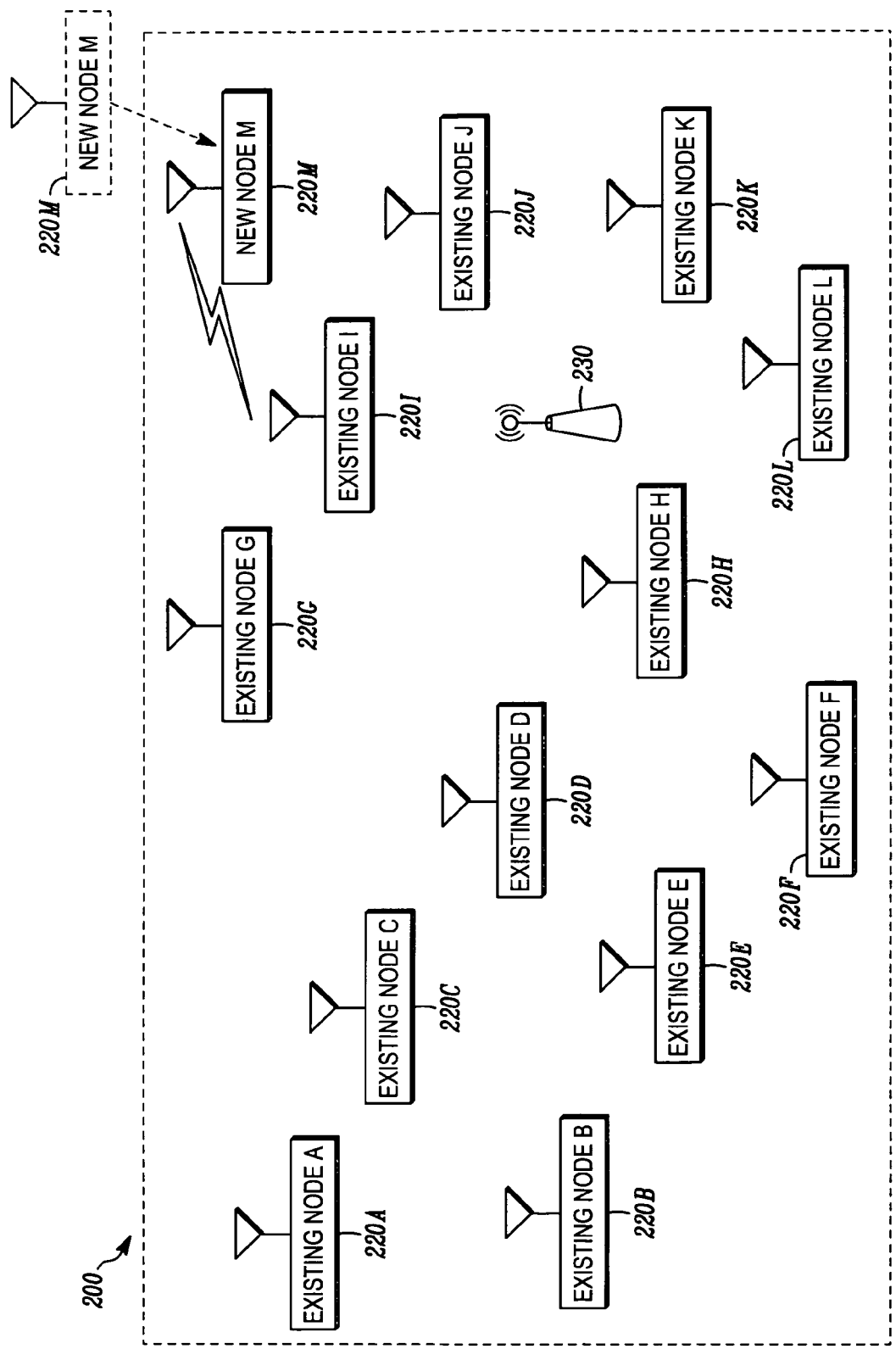
FIG. 3 is a block diagram of an exemplary ad hoc multi-hopping communication network as a new node attempts to join the ad hoc communication network and acquire a timeslot in the ad hoc communication network.
Figure 4:
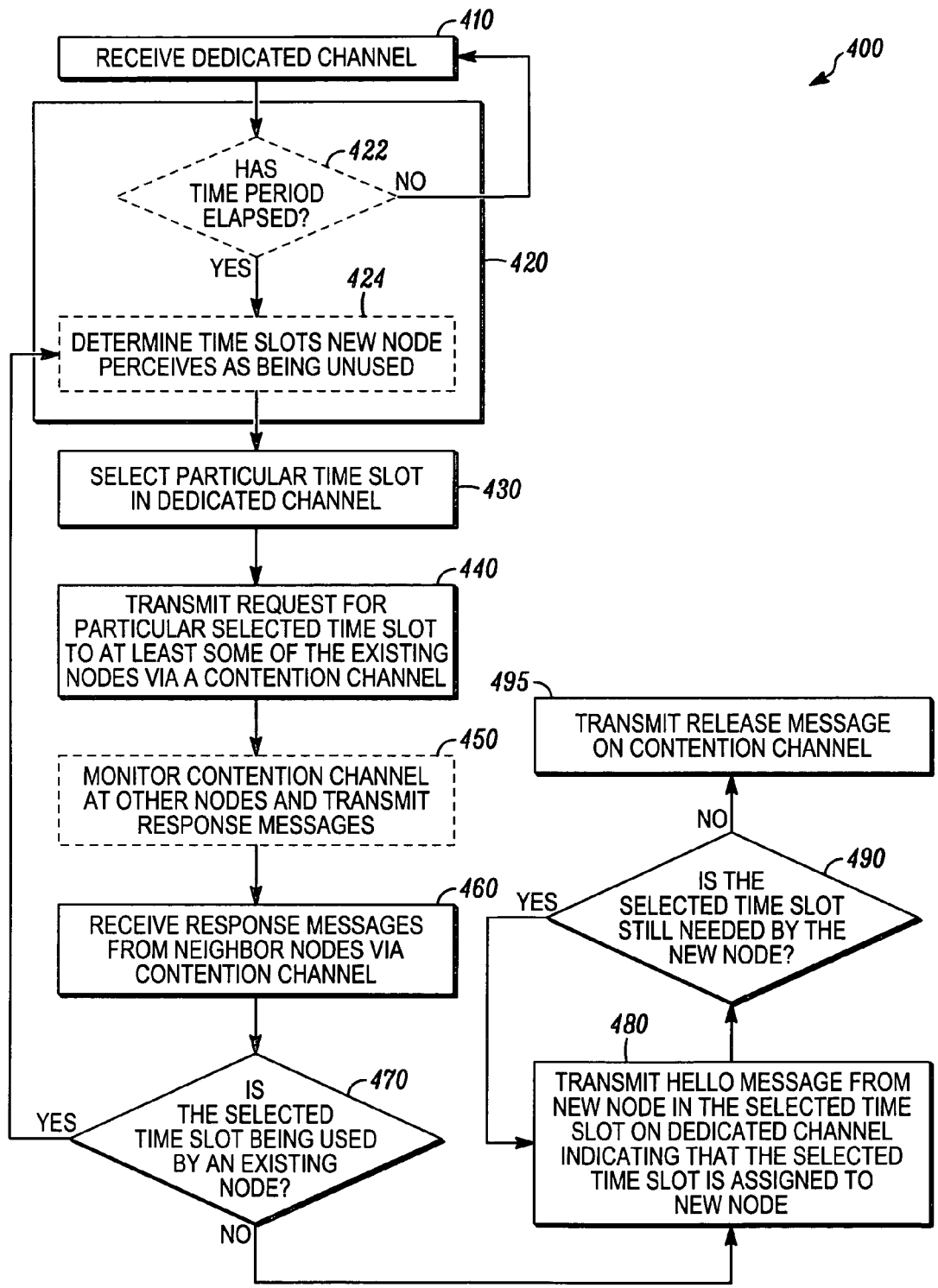
FIG. 4 is a flowchart showing an exemplary method for allocating timeslots to nodes in an ad hoc multi-hopping network in accordance with some embodiments of the invention.

FIG. 3 is a block diagram of the exemplary ad hoc communication network 200 shown in FIG. 2 as a new node 220M enters and attempts to acquire a timeslot in the ad hoc communication network 200. FIG. 4 is a flowchart showing an exemplary method 400 for allocating timeslots to nodes in an ad hoc multi-hopping network in accordance with some embodiments of the invention. FIG. 3 will be described in conjunction with a method 400 of FIG. 4 to describe techniques for reliably distributing network management information in timeslots shared by nodes in the ad hoc wireless network 200. In an ad hoc multi-hopping network, at any particular time, each node has its own unique neighborhood that is defined by a list of neighbor nodes (e.g., "neighbor list") maintained by each node in the network. The conditions for a particular node to be included in a particular neighborhood depend on factors such as the distance between that particular node and the host node of that neighborhood, the transmit power, and the path loss between these two nodes. Because the nodes of ad hoc multi-hopping networks are mobile, the neighborhood of each node continuously changes. The wireless ad hoc multi-hopping network presented in FIG. 3 has as many neighborhoods as the number of nodes.

As the new node 220M enters the network 200, the network 200 includes a number of existing nodes 220A-220L which are part of the network 200. Each of these existing nodes 220A-220L has been assigned a timeslot in a dedicated channel for periodically broadcasting a HELLO message comprising network management information as observed from the perspective of each of the existing nodes 220A-220L. The network management information can include, for example, network activity information from the perspective of the existing node, information identifying the timeslots that are in use, and interference information identifying the timeslots which are affected by interference. Of these existing nodes 220A-L, nodes 220G, I, J are neighbor nodes of the new node 220M when it enters the ad hoc network 200.

Each of the nodes 220A-M in the network is synchronized to a common clock. Synchronizing the clocks which control the transmission time and the unique assignment of timeslots can prevent the transmission of signals from more than one node at any particular time in any particular neighborhood. The nodes can be synchronized to this clock via a distributed synchronization technique, such as that described, for example, in U.S. Pat. No. 7,349,362 issued on Mar. 25, 2008, entitled "Method And System For Implementing The Time Division Multiple Access Method To Ad Hoc Multihopping Wireless Networks", and assigned to the assignee of the present invention, which is incorporated herein by reference in its entirety.

FIG. 4 is a flowchart showing an exemplary method 400 for allocating timeslots to nodes in an ad hoc multi-hopping network in accordance with some embodiments of the invention.

As new node 220M enters the ad hoc network 200, at step 410, it begins receiving the dedicated channel from each of its neighbor nodes 220G, I, J and in some embodiments other existing nodes that are within the communication range of the new node 220M. This dedicated channel includes network management information (NMI) from at least one of the existing nodes 220A-220L. The network management information received from each of the neighbor nodes 220G, I, J comprises information regarding the timeslots in the dedicated channel which are perceived by the neighbor nodes 220G, I, J as being "in use" by either that neighbor node 220G, I, J or other existing nodes in the neighborhood of the neighbor nodes 220G, I, J. For example, if neighbor node 220J has node 220H and 220K in its neighbor list, then neighbor node 220J includes information regarding the timeslots in the dedicated channel which are "in use" by either that neighbor node 220J or other existing nodes 220H,K in the neighborhood of neighbor node 220J. Existing nodes 220H, K may have information regarding the timeslots in the dedicated channel which are in use by existing nodes D, E, F, L to the extent nodes 220D, E, F, L are neighbor nodes of either node 220H or 220K.

Although the techniques described above describe the process as a new node approaches and enters the network, the same techniques can be used whenever a node's neighbor list changes such that the node gains or loses neighbor nodes or when a node travels between fixed or mobile neighbor nodes. For example, when the node gains a new neighbor node (or gained neighbor node), the node may impose new restrictions regarding the availability of timeslots since different timeslots may be used by neighbors of the gained neighbor node. As such, the gained neighbor node may identify possible conflicts in the assignments of timeslots and signal such conflicts to the node so that they can be corrected. When the node loses a neighbor node, the node gains additional timeslots (e.g., loses some of the restrictions on timeslot availability associated with the lost neighbor node), and therefore has more available timeslots to select from for broadcasting information in a reliable manner.

Figure 5:
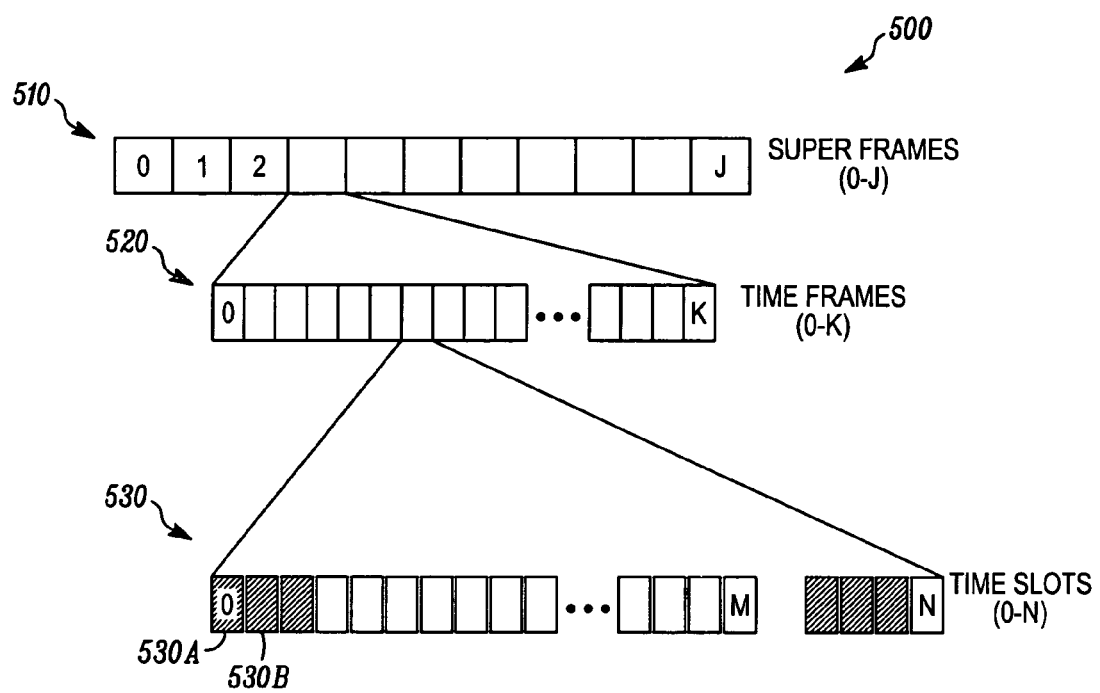
FIG. 5 shows an exemplary multi-level framing structure of a dedicated channel according to one exemplary implementation.

FIG. 5 shows an exemplary multi-level framing structure of the dedicated channel according to one exemplary implementation. In this example, the dedicated channel comprises a plurality of superframes (0-J). Each superframe (0-J) comprises a plurality of timeframes (0-K). Each timeframe (0-K) comprises a plurality of timeslots (0-N). Each of the existing nodes 220A-220L has been assigned one of the timeslots 530 in the dedicated channel. Each of the assigned timeslots in the dedicated channel can be used for periodically broadcasting a HELLO message comprising network management information as observed from the perspective of each of the existing nodes 220A-220L. In one possible implementation of this multi-level framing structure, each super frame can be five hundred (500) milliseconds (ms) in length and can be divided into fifty (50) timeframes each of which are ten (10) ms in duration. Each of the fifty (50) timeframes can be further sub-divided into thirty five (35) timeslots.

The multi-level framing structure of the dedicated channel can support TDMA and CSMA protocols. In one implementation, one timeslot 530A in each timeframe can be used as a timeslot for the dedicated channel, and the other timeslots in each timeframe can be allocated to the contention channel. By contrast, in another implementation, two timeslots 530A, B in each frame are used as timeslots for the dedicated channel, and all other timeslots in each frame are allocated to the contention channel. In one embodiment, the part of the timeframe not assigned to RID can be left open for contention accepted operation (a CSMA system for example), or can be divided into timeslots where some timeslots are used for TDMA operations while others are used for contention operations.

At step 420, the new node 220M monitors the dedicated channel for timeslots which the new node 220M perceives as being unused by other nodes in the ad hoc network 200.

For example, in one implementation, the new node 220M waits, at step 422, until a time period has elapsed. This time period can correspond to a time period until a predetermined number of superframes are detected. In this implementation, marked with dotted lines in FIG. 4, new node 220M determines, at step 422, if a time period has elapsed. If not, then the process reverts to step 410 where the new node continues to receive the dedicated channel. Alternatively, if the new node determines that the time period has elapsed (e.g., a certain number of superframes have been detected), then the process continues to step 424 where the new node 220M determines which of the timeslots the new node 220M perceives as being unused by other existing nodes in the network 200. New node 220M determines which timeslots in the dedicated channel the new node 220M perceives as being unused based on network management information received from the existing nodes 220A-220L over the dedicated channel.

In some implementations, the new node 220M assumes that certain timeslots in the dedicated channel are unused when the network management information received from its direct neighbor nodes (over the dedicated channel) indicates that certain timeslot(s) are not in use by any neighbor of the direct neighbor nodes. In other words, a particular time slot can be in use by the new node and in use by an existing node that is more than two hops away from the new node, however, a particular time slot can not be in use by the new node and an existing node that is two hops (or less) away from the new node since this will result in interference. In other implementations, the new node 220M can attempt to detect or decode energy corresponding to a HELLO message in the particular timeslot at the new node, and if a HELLO message can not be decoded, the new node 220M can designate the particular timeslot as being unused.

At step 430, the new node 220M selects a particular one of the timeslots in the dedicated channel which the new node 220M perceives as being unused.

At step 440, the new node 220M transmits a request (e.g., an allocation announcement message) via a contention channel to at least some of the existing nodes. The request informs the neighbor nodes 220G, I, J of the new node 220M that the new node 220M is requesting that the particular timeslot be assigned to the new node 220M.

At step 450, each of the existing nodes 220A-220L which is within range of the new node 220M monitors the contention channel and receives the allocation announcement message. Upon receiving the allocation announcement message, each of the neighbor nodes 220G, I, J of new node 220M determines whether the particular selected timeslot is available (e.g., unused) or in use by itself or a direct neighbor node, and transmits a response indicating whether the particular selected timeslot is available (e.g., unused) or in use by an existing node.

For example, in one implementation, the response transmitted on the contention channel by the neighbor nodes 220G, I, J comprises a denial message if any of the neighbor nodes 220G, I, J determines that the particular timeslot is being used by another existing node. This denial message can be transmitted if one of the neighbor nodes 220G, I, J determines that the particular timeslot is being used by one of the neighboring nodes (e.g., another neighbor node C, D, H, K). In another implementation, each response comprises information regarding which of the timeslots are being used by any of the existing nodes 220A-220L. For instance, each response comprises network management information associated with neighbor nodes 220G, I, J and neighbor nodes of those neighbor nodes 220G, I, J. The responses include information which indicates if the particular selected timeslot is being used by any of the existing nodes 220A-220L.

In another implementation, not shown in FIG. 4, each of the neighbor nodes 220G, I, J can include interference information in a periodically transmitted HELLO message. The interference information comprises an indication that the particular timeslot is affected by interference (so that interfering neighbors can know to restart the process of obtaining a new HELLO slot). For example, node 220I can attempt to detect and decode energy corresponding in a particular timeslot, and if this information can not be decoded, then node 220I can designate the particular timeslot as being affected by interference. Node 220I can then include interference information in a periodically transmitted HELLO message which indicates that the particular time slot is affected by interference. For example, if nodes 220D, M are "interfering" (e.g., nodes 220D, M are assigned the same time slot), then nodes 220D, M will realize that this particular time slot can not support both nodes. When nodes 220D, M receive this interference information (indicating that their assigned timeslot is perceived as interference by node 220I), at least one of the interfering nodes 220D, M (or both of the nodes 220D, M), can then return to step 410 and restart the process of acquiring a new time slot (e.g., node 220M and/or node 220D can select another particular timeslot which the new node 220M and/or node 220D perceives as being unused).

At step 460, the new node 220M receives responses from other nodes via the contention channel, and at step 470, the new node 220M determines, based on the responses, whether the particular selected timeslot is being used by any of the existing nodes 220A-220L in a two hop neighborhood.

If at step 470, the new node 220M determines, based on the responses, that the particular selected timeslot is being used by one of the existing nodes 220A-220L in the two hop neighborhood (e.g., new node 220M receives a denial message from one of the neighbor nodes 220G, I, J), then the process loops back to step 424 where the new node 220M determines another particular timeslot that the new node 220M perceives as being an unused timeslot.

If at step 470, the new node 220M determines, based on the responses, that the particular timeslot is not being used (or is "unused") by any of the two hop nodes, then at step 480, the new node 220M transmits a HELLO message in the particular timeslot. The HELLO message transmitted by new node 220M comprises network management information which indicates the particular timeslot is assigned to and in use by the new node 220M. The new node 220M can transmit the HELLO message, for example, if it receives response messages from its neighbor nodes which indicate that the particular timeslot is not in use by another of the existing nodes. Alternatively, the new node 220M can transmit the HELLO message, for example, if a denial message is not received by the new node 220M within a predetermined time period after transmitting the allocation announcement message.

At step 490, new node 220M determines if the selected timeslot (assigned to new node 220M) is still needed by the new node 220M. When the new node 220M no longer needs the particular timeslot, then at step 495, the new node 220M can transmit a release message on the contention channel to release the particular timeslot. Existing nodes 220A-220L which receive the release message mark the particular timeslot as unused. The particular timeslot is then available for use by other nodes in the neighborhood which seek to reserve and use that particular timeslot. If the new node 220M still wants to use the selected timeslot, then the process loops back to step 480 where new node 220M continues to transmit a HELLO message in the selected timeslot which indicates that it is still assigned to new node 220M.

Figure 6:
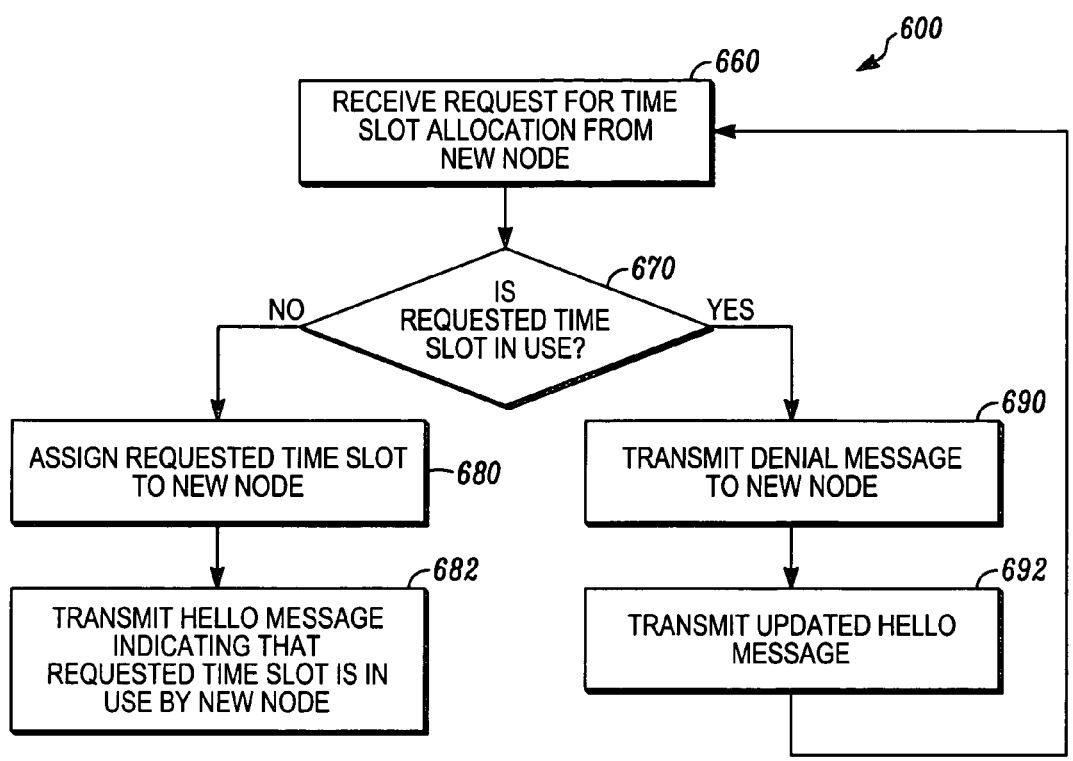
FIG. 6 is a flowchart showing an exemplary method for handling the received requests for allocating timeslots according to one exemplary implementation.

FIG. 6 is a flowchart showing an exemplary method 600 for handling the received requests for allocating timeslots according to one exemplary implementation. These techniques can be used, for example, by network nodes that have received a request from a new node for allocating a timeslot. The same operations would typically be executed by each of the nodes receiving the request.

At step 660, a node within communication range of the new node 220M receives a request message from the new node 220M. The request message informs the neighbor nodes of the new node 220M that the new node 220M is requesting that the particular timeslot be assigned to the new node 220M.

At step 670, the receiving node checks its network management information to determine if the requested timeslot (e.g., the time slot requested by new node 220M) is in use by any of its neighbor nodes. Although each node periodically transmits information regarding the availability of timeslots, because time passes between two consecutive transmissions (e.g., possibly up to a few seconds), the transmitted information may differ from the information that is currently available. In other words, there is a small probability that the new node 220M may request a timeslot that is already in use, but the new node 220M may not yet have received a notice that the requested timeslot is actually in use.

If the receiving node determines that the requested timeslot is not in use by any neighbor, then at step 680, the receiving node assigns the requested timeslot to the new node 220M, and, at step 682, transmits a HELLO message indicating that the requested timeslot is "in use" by the new node. This also lets other nodes know that the new node has been added to the network.

By contrast, if the receiving node determines that the requested timeslot is in use, then at step 690, the receiving node transmits a denial message to the new node 220M denying the request, and, at step 692, transmits an updated allocation announcement message that includes the latest information regarding the availability of timeslots in the channel (and also indicates that the requested timeslot is "in use" by a certain node).

As described above, techniques are provided for dynamically allocating timeslots to nodes operating in an ad hoc multi-hopping network. Each node in the ad hoc network can utilize network management information provided from other nodes in its neighborhood (e.g., its neighbor nodes or other existing nodes) to acquire a timeslot within the ad hoc network.

In the foregoing specification, specific embodiments of the present invention have been described. However, one of ordinary skill in the art appreciates that various modifications and changes can be made without departing from the scope of the present invention as set forth in the claims below. For example, while the description above describes authentication of nodes in an ad hoc multi-hopping network, it should be appreciated that these timeslot allocation techniques can also be applied, for example, to multicast groups as well, where a subset of nodes in the ad hoc network belongs to a multicast group, and those nodes allocate timeslots to each other using the timeslot allocation techniques described above.

In addition, while FIGS. 4-6 describe a possible application of those techniques to a situation where a new node approaches and enters the network, it will be appreciated that the techniques described in FIGS. 4-6 could also be applied in situations where a node is notified about a possible collision or conflicting time slot assignment on the dedicated channel. For instance, the same techniques can be used to acquire a new time slot when a given node receives an indication that another node has been assigned the same particular time slot as the given node.

Accordingly, the specification and figures are to be regarded in an illustrative rather than a restrictive sense, and all such modifications are intended to be included within the scope of present invention. The benefits, advantages, solutions to be problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for reliable exchange of information between nodes of a multi-hop wireless communication network, the method comprising:

broadcasting, by a plurality of nodes operating within the multi-hop wireless communication network, network management information for a dedicated channel, wherein the network management information includes usage and interference information for one or more timeslots of the dedicated channel, wherein the dedicated channel comprises a dedicated Reliable Information Distribution (RID) channel comprising a plurality of timeslots within a superframe, and wherein each of the plurality of nodes and are assigned one of the plurality of timeslots in the dedicated RID channel for periodically performing the broadcasting of the network management information in a HELLO message;

receiving, at a node in the neighborhood of the plurality of nodes, the dedicated RID channel comprising the network management information from the plurality of nodes in the multi-hop wireless communication network;

monitoring, at the node, the RID channel until a predetermined number of superframes are detected; whereupon identifying, by a node, a particular timeslot of the dedicated channel as unused from the network management information received from the plurality of nodes over the dedicated channel;

confirming, by the node, that the particular timeslot is unused by:

transmitting, by the node, an allocation announcement message to the plurality of nodes via a contention channel, wherein the allocation announcement message requests an assignment of the particular timeslot to the node;

receiving, at the node, a response to the allocation announcement message from at least two or more nodes of the plurality of nodes over the contention channel; and determining, by the node, at least in part based on the received responses, whether the particular timeslot is unused; and when the particular timeslot is confirmed as unused, broadcasting by the node within the particular timeslot.

2. A method according to claim 1, wherein the determining timeslots in the dedicated channel which are perceived as being unused by the node based on the network management information received from the plurality of nodes over the RID channel, comprises:

attempting to detect energy corresponding to the HELLO message in the particular timeslot at the node;

attempting to decode the HELLO message in the particular timeslot at the node; and designating the particular timeslot as being affected by interference if the HELLO message can not be decoded in the particular timeslot.

3. A method according to claim 2, further comprising:

transmitting the HELLO message comprising interference information in the particular timeslot if the node can not decode the HELLO message, wherein the interference information comprises an indication that the particular timeslot is affected by interference; and selecting, at the node, another particular one of the unused timeslots for periodically broadcasting the network management information perceived by the node.

4. A method according to claim 1, wherein the one or more timeslots in each frame is used as a timeslot for the RID channel, and wherein other timeslots in each frame are allocated to the contention channel.

5. A method according to claim 1, wherein the confirming further comprises:

monitoring the contention channel, at the plurality of nodes, for the allocation announcement message.

6. A method according to claim 1, wherein the receiving further comprises:

receiving a denial message from the at least two or more nodes of the plurality of nodes if the particular timeslot is being used by the at least two or more nodes of the plurality of nodes; and assigning the particular timeslot to the node if the denial message is not received within a predetermined time, and the method further comprising:

performing the broadcasting of the network management information in a HELLO message, from the node in the particular timeslot if the denial message is not received within the predetermined time.

7. A method according to claim 6, further comprising:

identifying, at the node, another particular timeslot that the node determines is an unused timeslot when the node receives the denial message from the at least two or more nodes of the plurality of nodes, wherein the denial message is transmitted when the at least two or more nodes of the plurality of nodes confirm that the particular timeslot is being used by the at least two or more nodes of the plurality of nodes.

8. A method according to claim 1, further comprising:

transmitting, from the node, an RID release message on the contention channel to release the particular timeslot, wherein the plurality of nodes which receive the RID release message mark the particular timeslot as unused.

9. A method according to claim 1, wherein the network management information further includes network activity information.

10. A multi-hop wireless communication network for reliably exchanging information between a plurality of nodes, the multi-hop wireless communication network comprising:

the plurality of nodes, operating within the multi-hop wireless communication network to broadcast network management information for a dedicated channel, wherein the network management information includes usage and interference information for one or more timeslots of the dedicated channel, wherein the dedicated channel comprises a dedicated Reliable Information Distribution (RID) channel comprising a plurality of timeslots within a superframe, and wherein each of the plurality of nodes and are assigned one of the plurality of timeslots in the dedicated RID channel for periodically performing the broadcast of the network management information in a HELLO message; and a node in the neighborhood of the plurality of nodes and configured to:

receive the dedicated RID channel comprising the network management information from the plurality of nodes in the multi-hop wireless communication network;

monitor the dedicated channel for a time period;

identify a particular timeslot of the dedicated channel as being unused based on the network management information received from the plurality of nodes over the dedicated channel;

confirm that the particular timeslot is unused by:

transmitting an allocation announcement message via a contention channel to the plurality of nodes, wherein the allocation announcement message requests an assignment of the particular timeslot to the node;

receiving a response to the allocation announcement message from at least two or more nodes of the plurality of nodes over the contention channel; and determining, at least in part based on the received responses, whether the particular timeslot is unused; and broadcast within the particular timeslot when the particular timeslot is confirmed as unused.

11. A multi-hop wireless communication network according to claim 10, wherein each of the plurality of nodes is configured to monitor the contention channel for the allocation announcement message, and wherein each of the plurality of nodes is configured to:

determine whether any node in a neighbor list of that plurality of nodes has indicated that the particular timeslot is in use;
generate the response indicating whether the particular timeslot is in use; and
transmit the response to the node.

12. A multi-hop wireless communication network according to claim 10, wherein the response comprises a denial message if any of the plurality of nodes determine that the particular timeslot is being used by the plurality of nodes, wherein the denial message is transmitted if one of the plurality of nodes determines that the particular timeslot is being used by another neighbor node of one of the plurality of nodes.

13. A multi-hop wireless communication network according to claim 12, wherein the node is configured to:
select another particular timeslot that the node perceives as being an unused timeslot if the node receives the denial message.

14. A multi-hop wireless communication network according to claim 10, wherein each of the plurality of nodes is configured to:
transmit a HELLO message comprising interference information in the particular timeslot if each of the plurality of nodes can not decode the particular timeslot, wherein the interference information comprises an indication that the particular timeslot is affected by interference, and
wherein the node is further configured to select another particular timeslot the node perceives as being unused if the node receives the interference information.

15. A multi-hop wireless communication network according to claim 10, wherein the network management information further includes network activity information.

16. A multi-hop wireless communication network according to claim 10, wherein the node is further configured to transmit a release message on the contention channel to release the particular timeslot when the particular timeslot is no longer needed by the node, wherein the plurality of nodes which receive the release message mark the particular timeslot as unused.

17. A multi-hop wireless communication network according to claim 10, wherein the one or more timeslots in each superframe is used as a timeslot for the dedicated channel, and wherein other timeslots in each frame are allocated to the contention channel.

18. A multi-hop wireless communication network according to claim 10, wherein the response comprises information regarding which of the one or more timeslots are being used by any of the plurality of nodes.

19. A node for reliable exchange of information between nodes of a multi-hop wireless communication network, the node comprising:
a receiver configured to receive broadcasted network management information for a dedicated channel from a plurality of nodes operating within the multi-hop wireless communication network, wherein the network management information includes usage and interference information for one or more timeslots of the dedicated channel, wherein the dedicated channel comprises a dedicated Reliable Information Distribution (RID) channel comprising a plurality of timeslots within a superframe, and wherein each of the plurality of nodes are in the neighborhood of the node and are assigned one of the plurality of timeslots in the dedicated RID channel for periodically performing the broadcasting of the network management information in a HELLO message; and
a processor configured to:
receive the network management information from the plurality of nodes in the multi-hop wireless communication network from the dedicated RID channel comprising;
monitor the dedicated channel for a time period;
identify a particular timeslot of the dedicated channel as unused based on the received network management information received from the plurality of nodes over the dedicated channel;
confirm that the particular timeslot is unused using responses received by the receiver over the contention channel from at least two or more of the plurality of nodes to an allocation announcement message transmitted by the node, wherein the allocation announcement message requested assignment of the particular time slot to the node; and
a transmitter configured to:
transmit the allocation announcement message via a contention channel; and
broadcast within the particular timeslot when the particular timeslot is confirmed as unused by the processor.

* * * * *